(12) United States Patent
Kuraishi et al.

(10) Patent No.: US 8,283,822 B2
(45) Date of Patent: Oct. 9, 2012

(54) SMALL-SIZED MOTOR

(75) Inventors: Daigo Kuraishi, Nagano (JP); Akira Shimizu, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 325 days.

(21) Appl. No.: 12/703,372

(22) Filed: Feb. 10, 2010

(65) Prior Publication Data

US 2010/0201214 A1 Aug. 12, 2010

(30) Foreign Application Priority Data

Feb. 10, 2009 (JP) ................................. 2009-029033

(51) Int. Cl.
*H02K 5/00* (2006.01)
*H02K 11/00* (2006.01)

(52) U.S. Cl. .................. 310/71; 310/40 MM; 310/68 B; 310/68 R (58) Field of Classification Search ............ 310/40 MM, 310/68 B, 68 R, 71; *H02K 5/00, 11/00*
See application file for complete search history.

(56) References Cited

U.S. PATENT DOCUMENTS

| | | | | |
|---|---|---|---|---|
| 4,853,568 A * | 8/1989 | Fujiwara | ..................... | 310/68 C |
| 5,389,846 A * | 2/1995 | Okazaki et al. | .......... | 310/40 MM |
| 5,945,766 A * | 8/1999 | Kim et al. | ..................... | 310/268 |
| 6,140,721 A * | 10/2000 | Ibata et al. | .................. | 310/67 R |
| 6,166,468 A * | 12/2000 | Suzuki et al. | .................. | 310/90 |
| 7,932,655 B2 * | 4/2011 | Buhler et al. | ................ | 310/90.5 |
| 2002/0076979 A1 * | 6/2002 | Terauchi et al. | .............. | 439/567 |
| 2004/0032345 A1 * | 2/2004 | Kazuya et al. | .................. | 341/15 |
| 2008/0231128 A1 * | 9/2008 | Buhler et al. | ................ | 310/90.5 |
| 2008/0238267 A1 * | 10/2008 | Scharrer et al. | ............. | 310/68 B |
| 2010/0201214 A1 * | 8/2010 | Kuraishi et al. | ................. | 310/71 |

FOREIGN PATENT DOCUMENTS

JP 2001-320867 11/2001

* cited by examiner

*Primary Examiner* — John K Kim
(74) *Attorney, Agent, or Firm* — Rankin, Hill & Clark LLP (57) ABSTRACT

A connection circuit board includes a main portion and a lead wire connecting portion. The main portion is positioned between an end portion of a motor case body and an end bracket. The lead wire connecting portion projects outwardly from the motor case body. A protective cap including a connecting portion receiving chamber for receiving the lead wire connecting portion of the connection circuit board is attached to the lead wire connecting portion through an engaging structure. An adhesive is filled in the connecting portion receiving chamber of the protective cap. In a small-sized motor of the above configuration, the protective cap can securely be fixed to the motor case.

5 Claims, 13 Drawing Sheets

SMALL-SIZED MOTOR

TECHNICAL FIELD

The present invention relates to a small-sized motor having a motor case provided with a lead wire connecting portion thereoutside.

BACKGROUND ART

A small-sized motor has structural constraints which make it difficult to ensure a space for connection of a lead wire inside a motor case and thus adopts a structure in which a lead wire connecting portion for connection of a lead wire is exposed outside a motor case. Accordingly, in a conventional small-sized motor, a protective cover for protecting the lead wire connection portion exposed outside the motor case is fixed outside the motor case. In this configuration, a space for screwing cannot be ensured on the motor case in the small-sized motor so that the protective cover is fixed by an adhesive to the motor case. Refer to Jpn. Pat. Appln. Publication No. 2001-320867 FIG. 4) (Patent Document 1).

However, when the protective cover is fixed only by an adhesive like the conventional small-sized motor, there is a limitation on an increase in the fixing strength of the protective cover, with the result that the protective cover easily comes off from the motor case. Further, if the protective cover is fixed by an adhesive to the motor case, it is not easy to keep the position of the protective cover until the adhesive is cured, which may easily cause the fixing position of the protective cover to be displaced.

SUMMARY OF THE INVENTION

An object of the present invention is to provide a small-sized motor configured to allow a protective cap to be securely fixed to a motor case.

Another object of the present invention is to provide a small-sized motor having a structure in which positioning for fixing a protective cap can easily be made and displacement is unlikely to occur.

A small-sized motor, of which improvement is aimed at by the present invention, includes a motor case body, a stator, a rotor, a pair of end brackets, and a connection circuit board. The motor case body has a cylindrical shape and houses a stator and a rotor to be described later. The stator has a plurality of winding portions and is provided inside the motor case body. In the present specification, the configuration of the stator is not especially limited as long as the stator has the winding portion fixed thereto. For example, the stator may include only a cylindrical yoke having an inner peripheral surface to which winding portions are attached, or may include an ordinary stator core including a plurality of magnetic pole portions wound with windings on an inner peripheral portion of a yoke. Further, the stator may be constituted by the motor case and winding portions. The rotor is disposed inside the stator. The pair of end brackets are fixed to both end portions of the motor case body so as to rotatably support a rotary shaft to which the rotor is fixed. A sensor device for detecting the rotational position of the rotor may be fixed to one end bracket of the pair of end brackets.

The connection circuit board has a main portion and a lead wire connecting portion. The main portion is positioned between one end portion of the both end positions of the motor case body and one end bracket of the pair of end brackets, and the lead wire connecting portion projects outward from the motor case body. A plurality of wire-end portions extending from the plurality of winding portions are electrically connected to a circuit pattern on the connection circuit board, and a plurality of lead wires are electrically connected to a plurality of connection electrodes connected to the circuit pattern provided on the lead wire connecting portion.

In addition to the above components, the small-sized motor according to the present invention further includes a protective cap. The protective cap is a member for protecting a portion at which the connection circuit board and a lead wire are connected to each other, i.e., a member for protecting a lead wire connecting portion of the connection circuit board projecting outward from the motor case body. Considering electrical insulation, the protective cap is preferably formed of an insulating resin material. The protective cap includes a connecting portion receiving chamber for receiving the lead wire connecting portion of the connection circuit board.

The protective cap is attached to the lead wire connecting portion through an engaging structure. Further, the protective cap is fixed to the motor case body and/or one end bracket using an adhesive. The engaging structure has a configuration in which when the protective cap is attached to the motor case body, the protective cap and lead wire connecting portion are engaged with each other in the connecting portion receiving chamber of the protective cap. When the protective cap including the connecting portion receiving chamber is attached to the lead wire connecting portion through the engaging structure as with the small-sized motor according to the present invention, the lead wire connecting portion can reliably be protected, as well as, the protective cap can securely be attached to the motor case body to make it difficult for the protective cap to come off from the fixing position of the motor case body.

The engaging structure between the protective cap and the lead wire connecting portion may have any configuration as long as it can securely fix the protective cap to the motor case body. For example, a structure may be adopted in which the engaging structure includes an engaging portion formed integrally with a wall portion surrounding the connecting portion receiving chamber of the protective cap and an engaged portion formed in the lead wire connecting portion of the connection circuit board so as to be engaged with the engaging portion, and an engagement between the engaging portion and the engaged portion is established when the protective cap is brought close to the outer surface of the motor case body. With such an engaging structure, positioning of the protective cap can easily be performed.

The protective cap may include a main wall portion facing the motor case body and a peripheral wall portion extending toward the motor case body from the peripheral portion of the main wall portion. The main wall portion may have a pair of hooks extending toward the motor case body as the engaging portion. The lead wire connecting portion of the connection circuit board may be shaped to include a pair of end engaged portions capable of engaging with the pair of hooks. With the above configuration of the protective case and the lead wire connecting portion of the connection circuit board, it is possible to extremely easily perform the positioning of the protective cap, thereby positively preventing displacement when the protective cap is fixed by an adhesive.

It is preferable that an opening portion to be closed by a part of the one end bracket is formed in at least the peripheral wall portion of the protective cap. Further, in this configuration, a configuration is preferable in which the hooks are arranged at a position on the side of the opening portion with respect to the lead wire connecting portion and the shape of the pair of hooks and position of the pair of end engaged portions are defined so that, in the course of bringing the protective cap close to the outer surface of the motor case body, leading end portions of the hooks are slid on a surface of the lead wire connecting portion facing the opening portion and then engaged with the end engaged portions. By defining the shape of the hooks and position of the end engaged portions as described above, it is possible to prevent the protective cap from being displaced from the fixing position not only in the direction that the lead wire connecting portion projects outward from the motor case body but also in the extending direction of the rotary shaft of the motor.

When the size of one end bracket is increased for fixing a sensor device for detecting the rotational position of the rotor to the one end bracket, there occurs a step difference between the one end bracket and motor case body, allowing a part of the one end bracket to serve as a wall to thereby close the opening portion of the protective cap.

BRIEF DESCRIPTION OF DRAWINGS

FIGS. 4A to 4C illustrate an example of a connection circuit board used in the small-sized motor according to this embodiment.

FIGS. 5A to 5E illustrate an example of a protective cap used in the small-sized motor according to this embodiment.

FIGS. 6A and 6B illustrate an example of an engaging structure used in the small-sized motor according to this embodiment.

DESCRIPTION OF EMBODIMENTS

Figure 1:
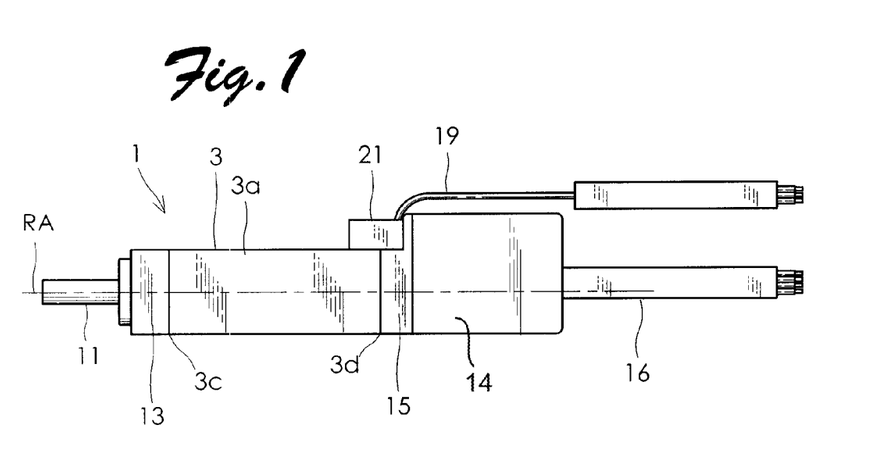
FIG. 1 is a front view of a small-sized motor according to an embodiment of the present invention.
Figure 2:
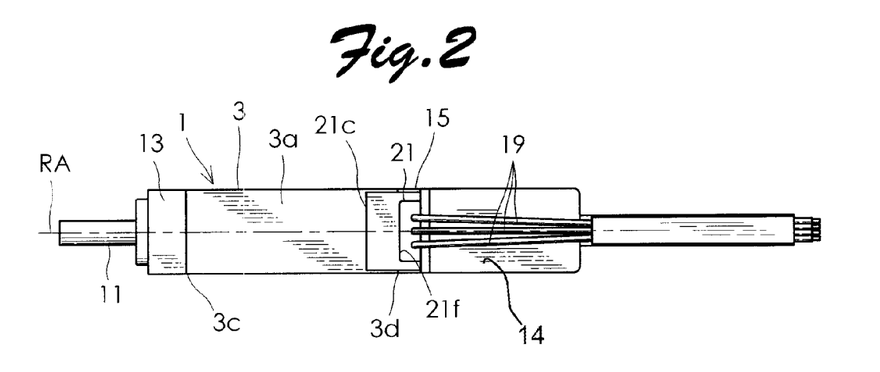
FIG. 2 is a plan view of the small-sized motor according to this embodiment.
Figure 3:
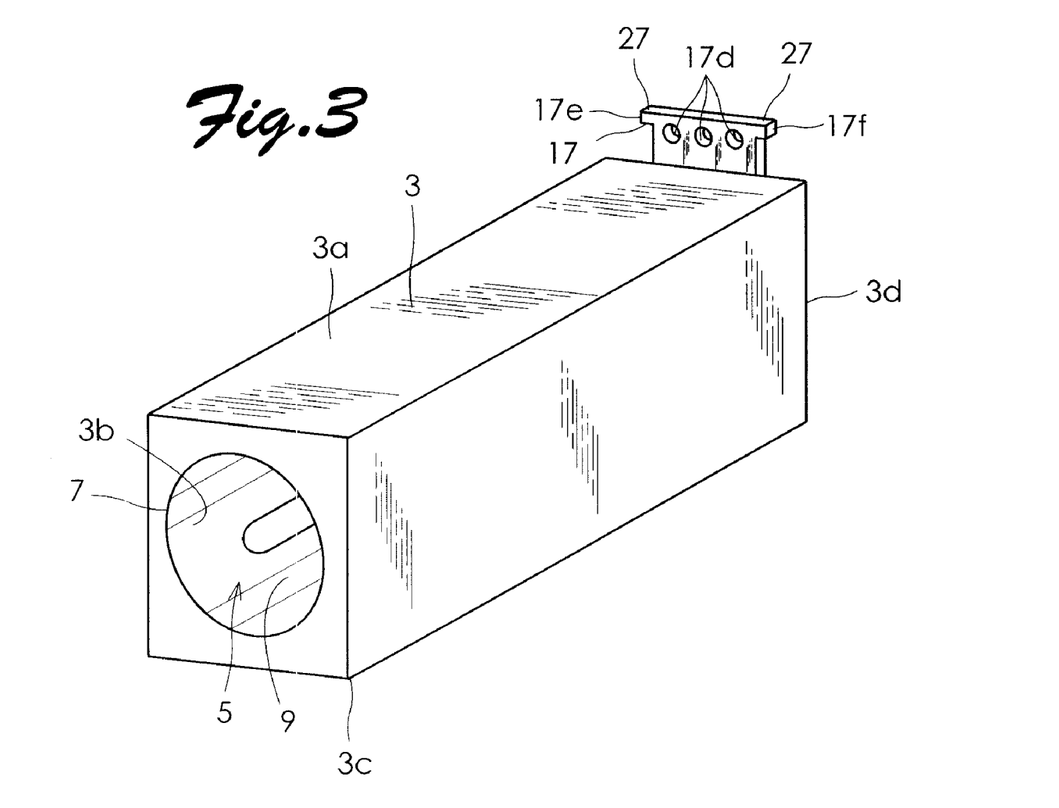
FIG. 3 is a partly omitted perspective view of the small-sized motor according to this embodiment.

Hereinafter, an embodiment of a small-sized motor according to the present invention will be described in detail with reference to the accompanying drawings. FIG. 1 is a front view of the small-sized motor according to the present embodiment, FIG. 2 is a plan view of the small-sized motor, and FIG. 3 is a partly omitted perspective view of the small-sized motor. A small-sized motor 1 of the present embodiment includes a cylindrical motor case body 3. The motor case body 3 is formed of a magnetic material and is shaped to have a rectangular solid-shaped outer peripheral surface 3a outside thereof and a substantially columnar-shaped inner peripheral surface 3b in an inner portion 5 thereof.

A plurality of winding portions 9 are attached to the inner portion 5 (inner peripheral surface 3b) of the motor case body 3 to constitute a stator 7. That is, in the present embodiment, the motor case body 3 serves also as a so-called yoke of the stator core. The stator 7 in the present embodiment is a so-called coreless type stator having a structure in which the plurality of annular winding portions 9 are adhesively fixed onto the inner peripheral surface 3b of the motor case body 3.

A pair of end brackets (end brackets 13 and 15) are fixed respectively to both end portions (end portions 3c and 3d) of the motor case body 3 in the direction of a rotary shaft RA of the motor case body 3. The end brackets 13 and 15 rotatably support the rotary shaft RA to which a rotor 11 is fixed. In this embodiment, a sensor device (encoder) is fixed to the end bracket 15 facing the end portion 3d of the motor case body 3 and thereby can detect the rotational position of the rotor 11. A lead wire 16 different from a lead wire 19 to be described later is connected to the sensor device.

Figure 4A:
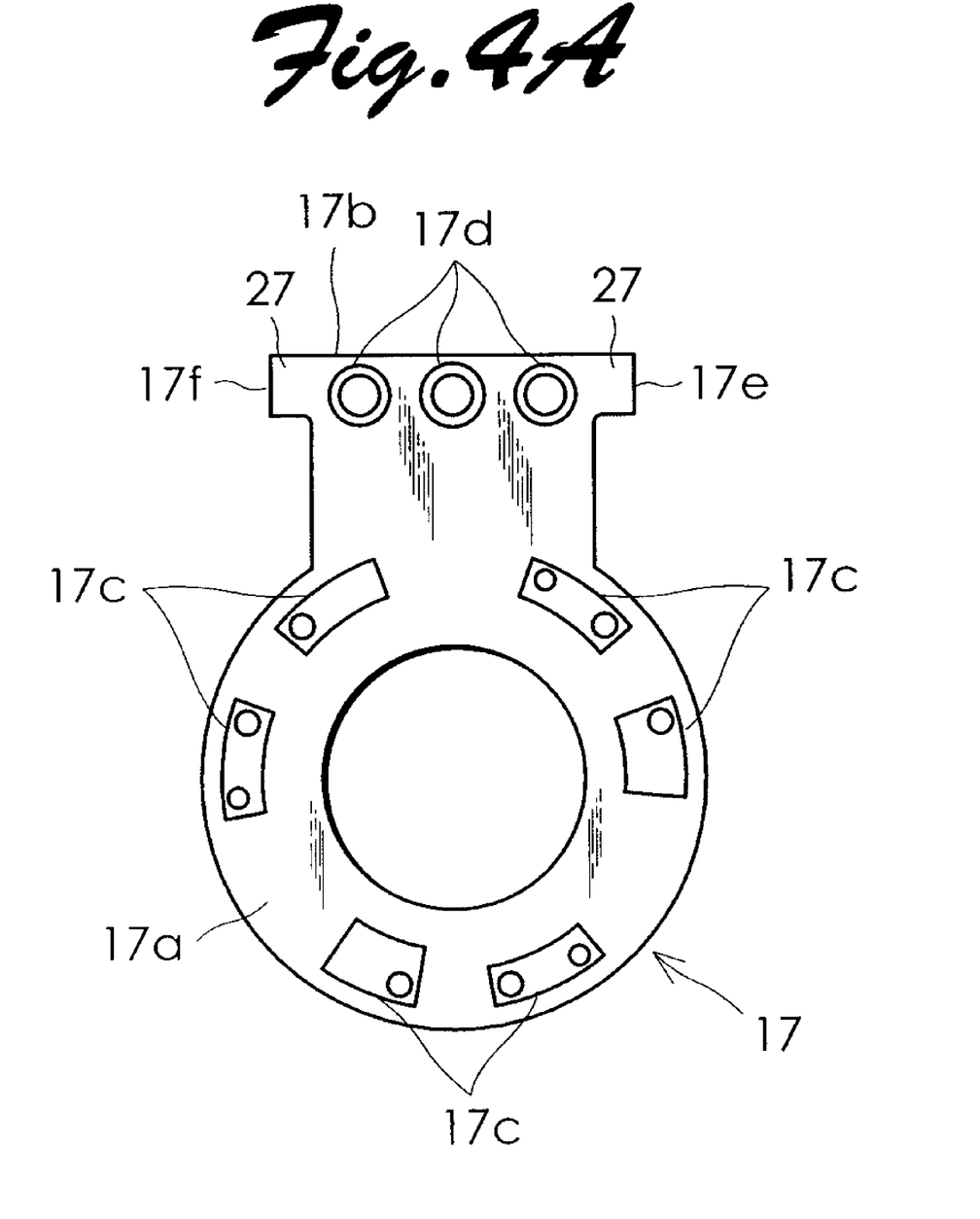
FIG. 4A is viewed from one end bracket side.
Figure 4B:
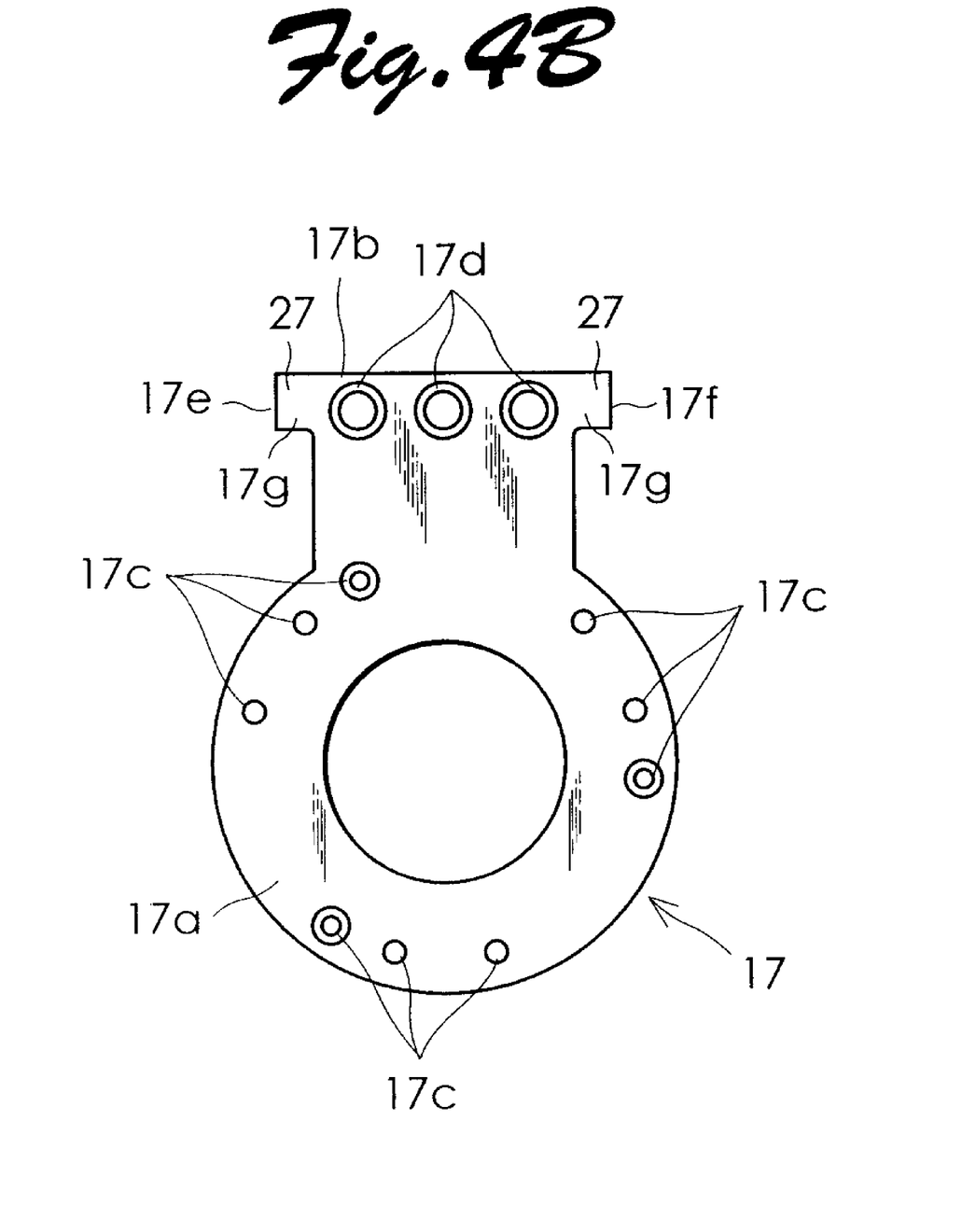
FIG. 4B is viewed from motor case body side.
Figure 4C:
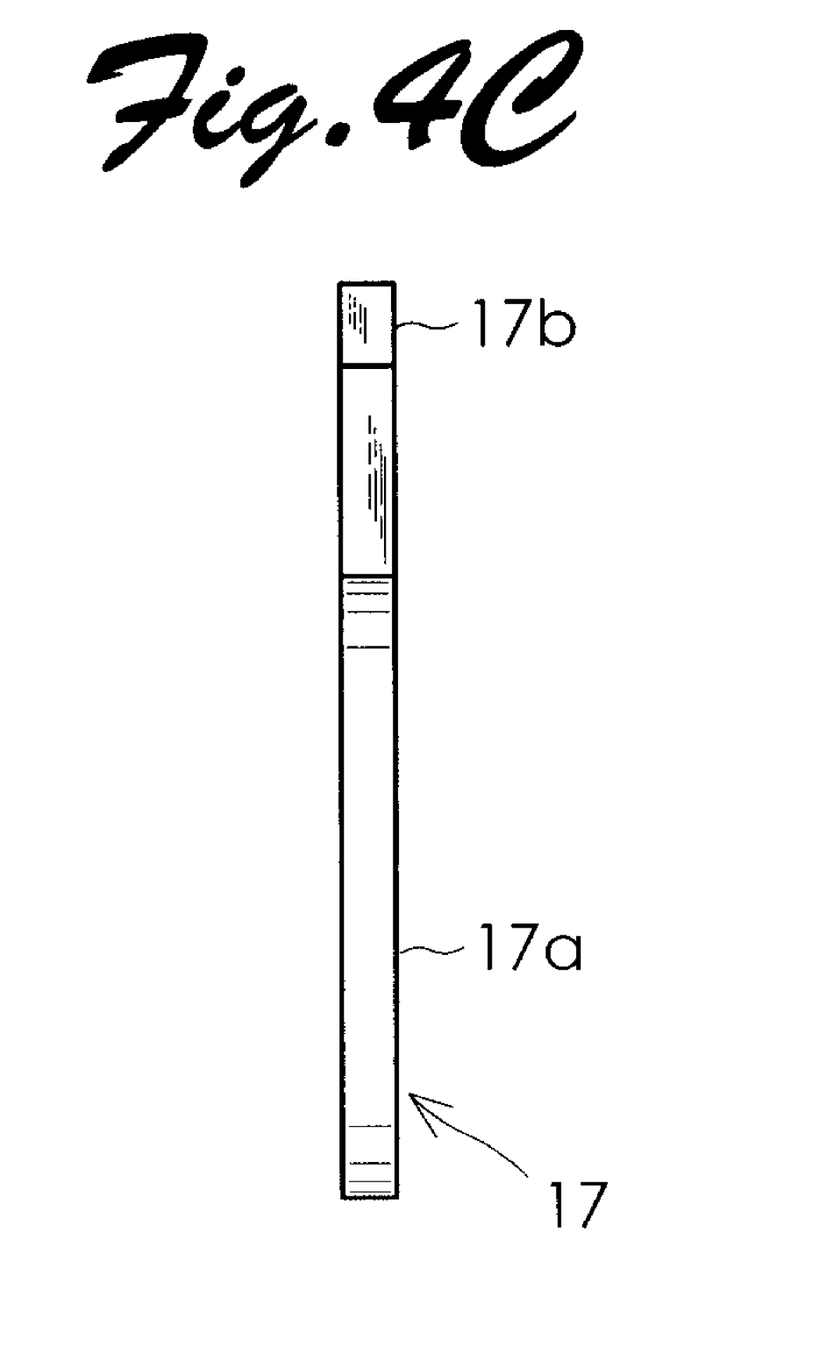
FIG. 4C is a right side view of FIG. 4A.
Figure 5A:
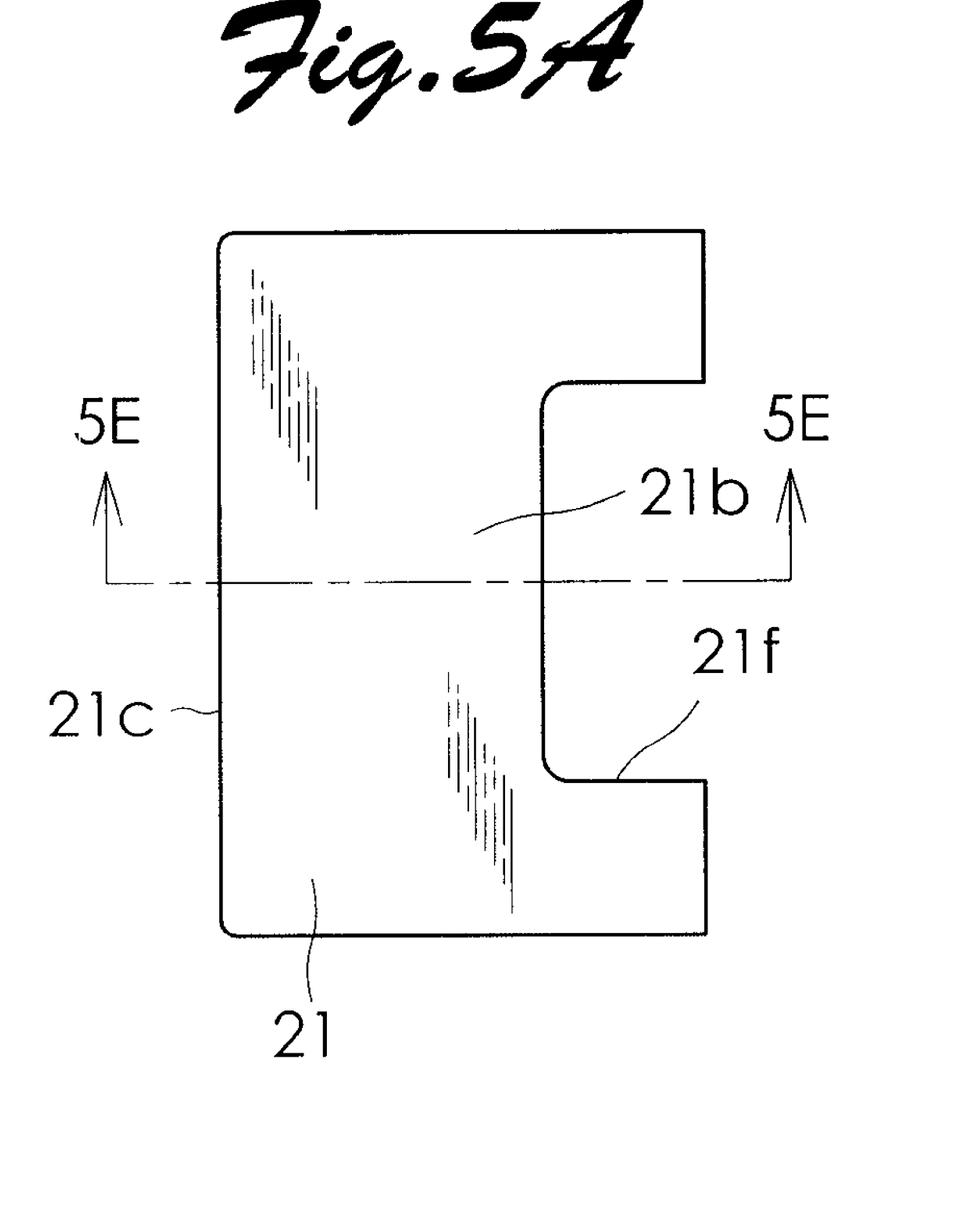
FIG. 5A is a plan view as viewed from the same direction as in FIG. 2.
Figure 5B:
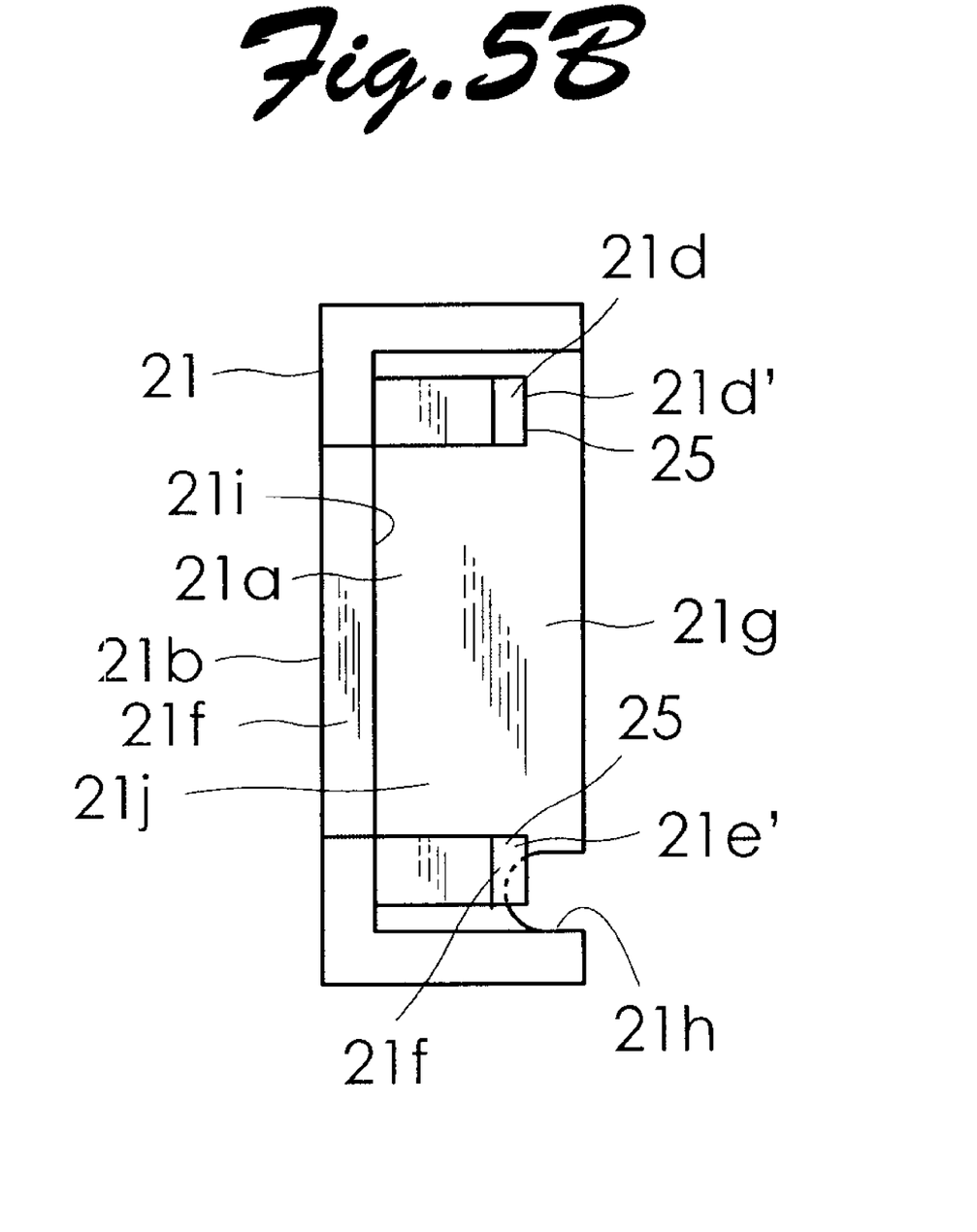
FIG. 5B is a right side view with respect to FIG. 5A.
Figure 5C:
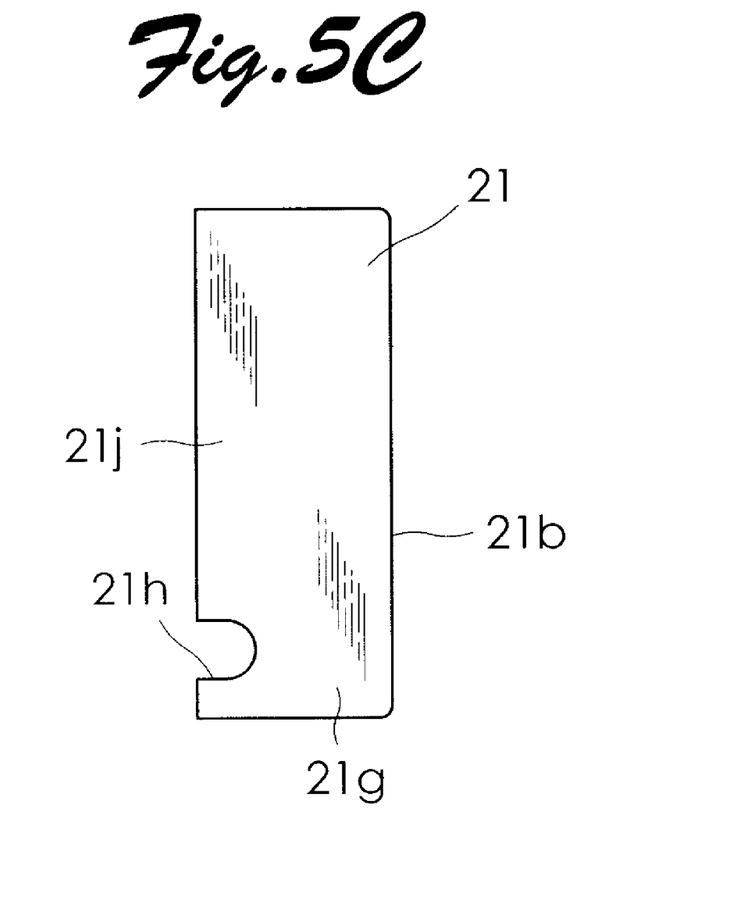
FIG. 5C is a left side view with respect to FIG. 5A.
Figure 5D:
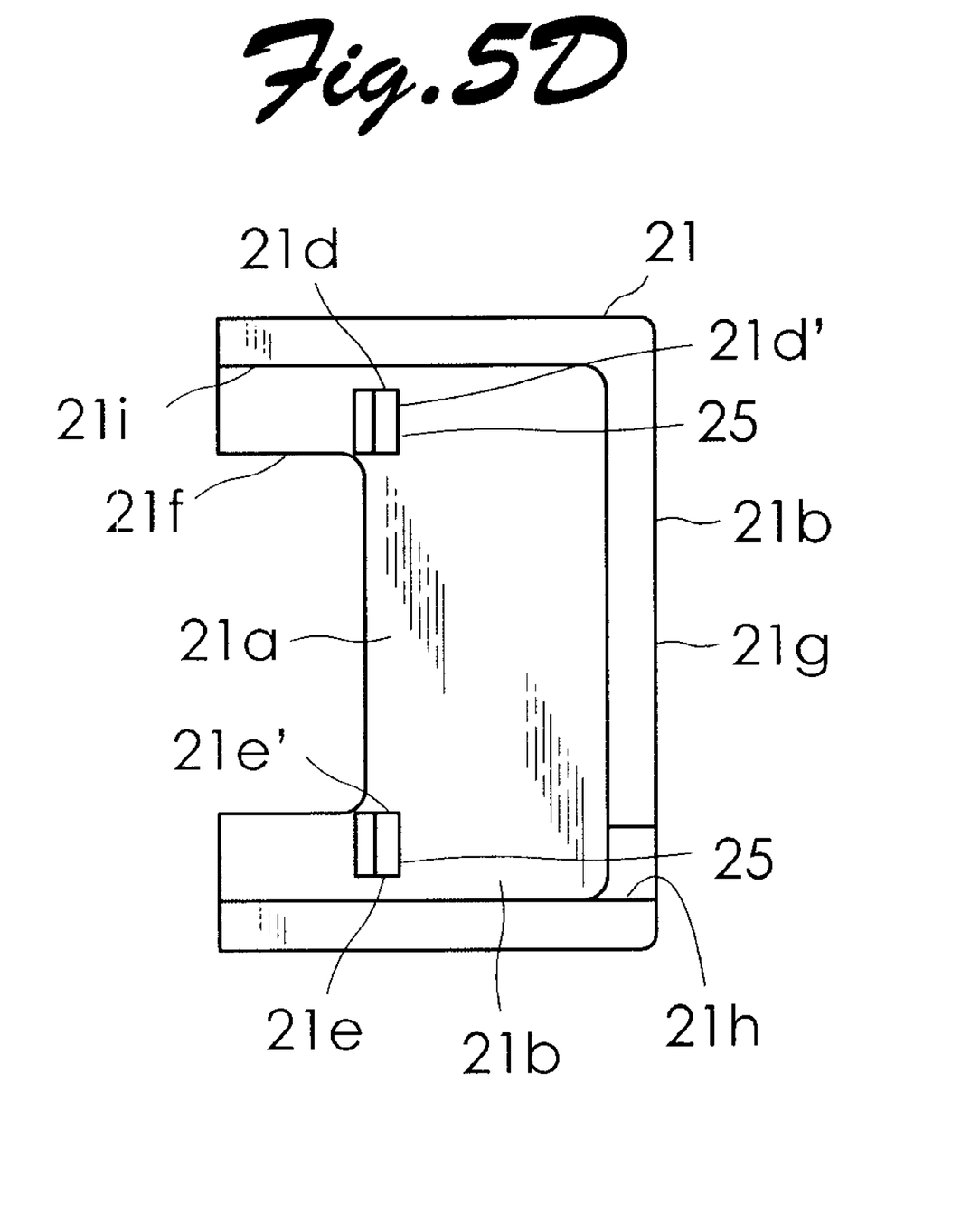
FIG. 5D is a bottom view with respect to FIG. 5A.
Figure 5E:
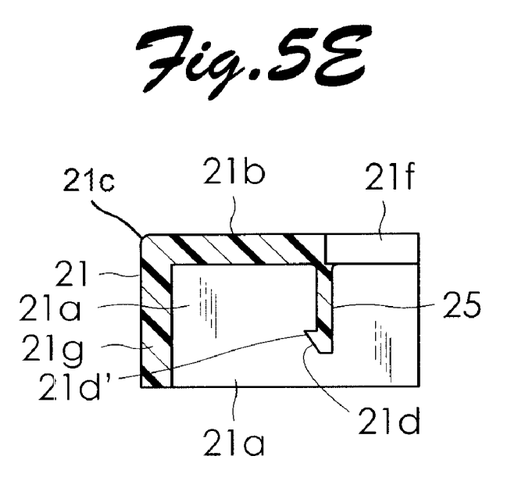
FIG. 5E is a cross-sectional view taken along E-E line of FIG. 5A.

A connection circuit board 17 including a main portion 17a and a lead wire connecting portion 17b for connection of a later described lead wire 19 is disposed on the side of the end portion 3d of the motor case body 3. More specifically, the main portion 17a of the connection circuit board 17 is positioned between the end portion 3d of the motor case body 3 and the end bracket 15, and the lead wire connecting portion 17b projects outward from the outer peripheral surface 3a of the motor case body 3. As shown in FIGS. 4A to 4C, a circuit pattern 17c is formed on the connection circuit board 17. A plurality of not-shown wire-end portions extending from the winding portions 9 are electrically connected to the circuit pattern 17c formed on the main portion 17a of the connection circuit board 17, and a plurality of lead wires 19 are electrically connected to a plurality of connection electrodes 17d connected to the circuit pattern 17c formed on the lead wire is connecting portion 17b.

Figure 6A:
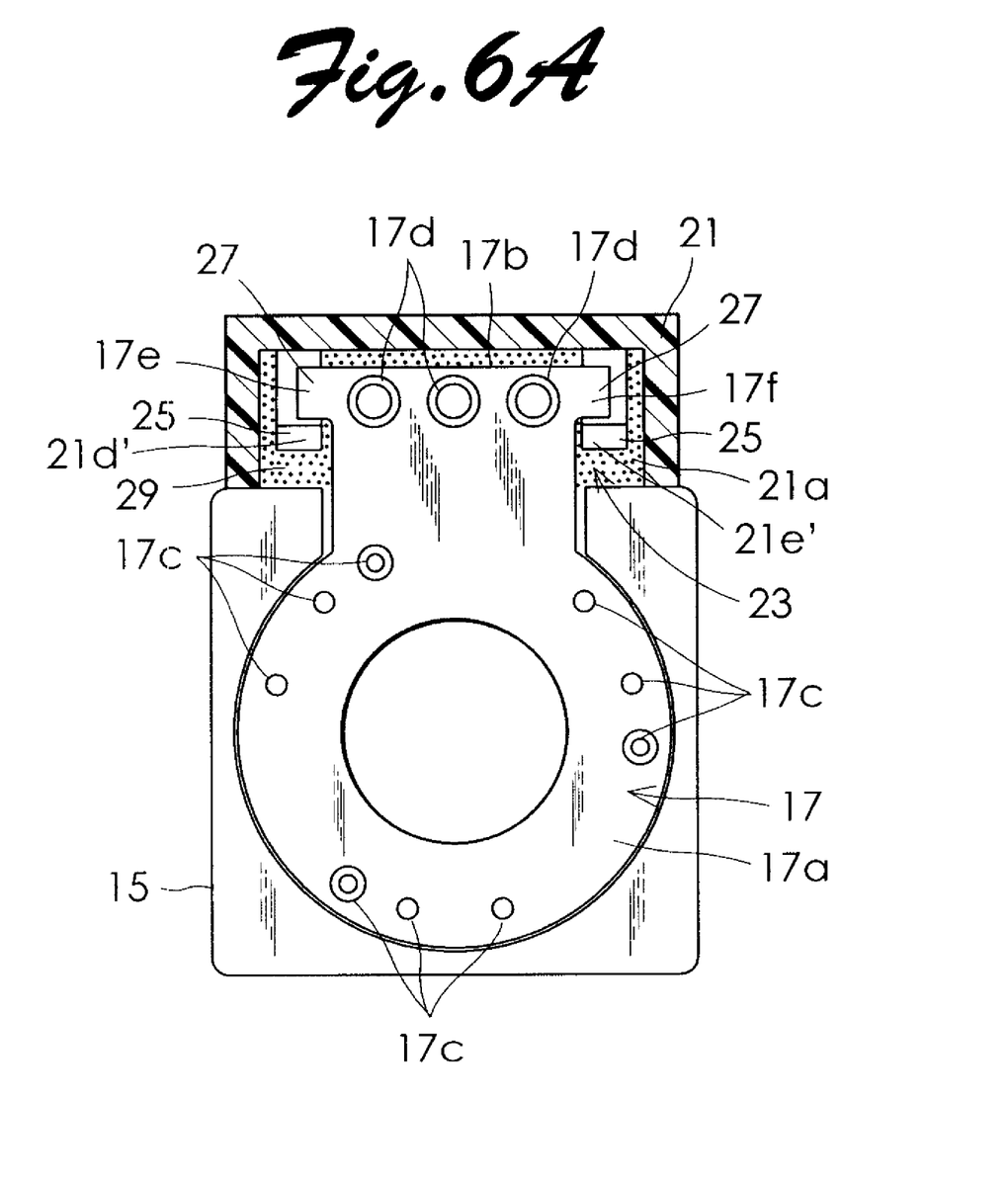
FIG. 6A is a cross-sectional view taken along A-A line of FIG. 6B.
Figure 6B:
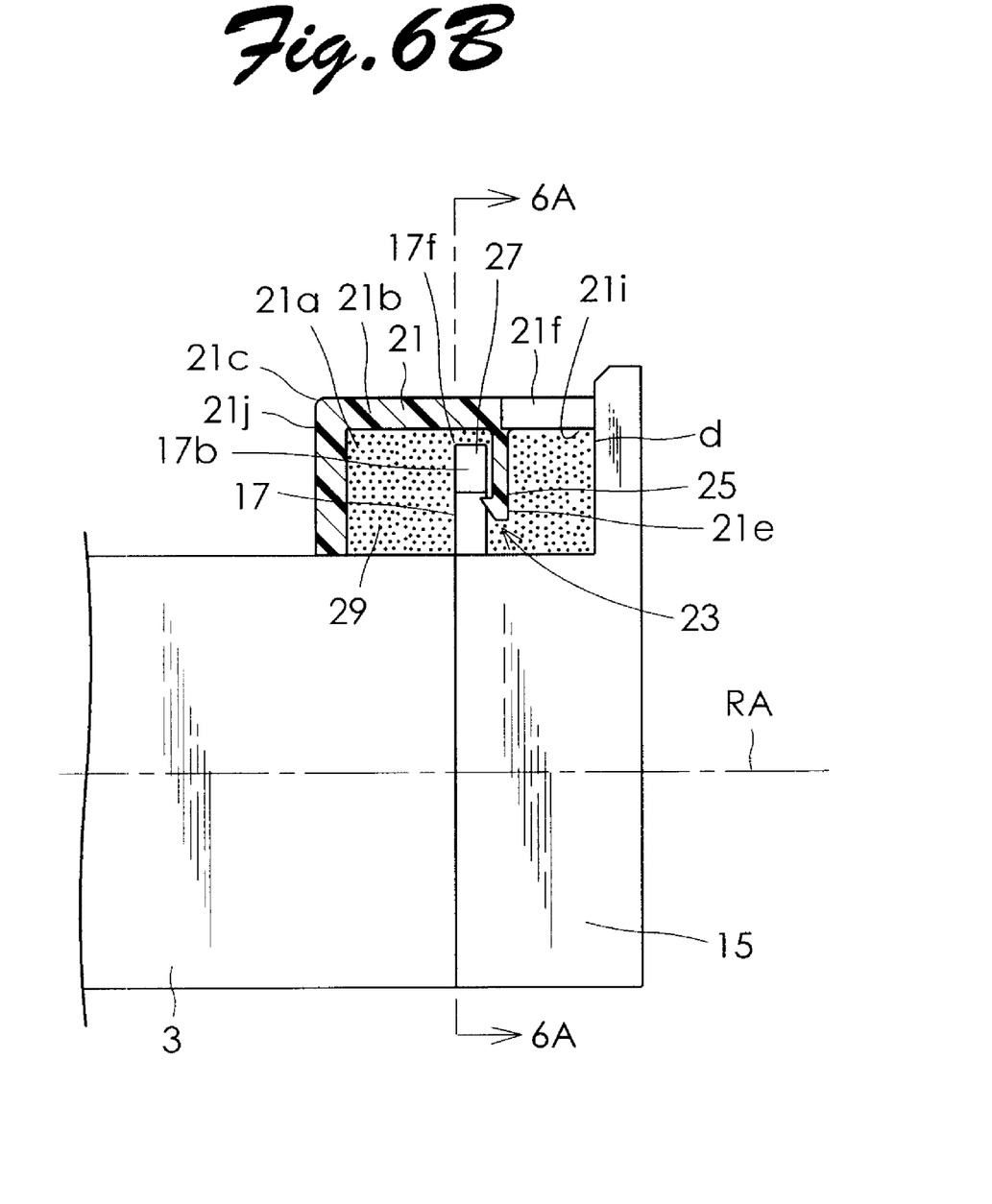
FIG. 6B is a partly omitted cross-sectional of the engaging structure used in this embodiment.

As shown in FIGS. 1 and 2, a protective cap 21 is fixed to the end portion 3d of the motor case body 3 to which the end bracket 15 is fixed. As shown in FIGS. 5 and 6, a connecting portion receiving chamber 21a for receiving the lead wire connecting portion 17b of the connection circuit board 17 is formed inside the protective cap 21. The connecting portion receiving chamber 21a is configured so as to prevent the circuit pattern 17c and plurality of connection electrodes 17d formed on the lead wire connecting portion 17b and lead wires 19 connected to the connection electrodes 17d from contacting the inner surface of the protective cap 21.

The protective cap 21 is attached to the lead wire connecting portion 17b through an engaging structure 23. That is, when the protective cap 21 is attached to the end portion 3d of the motor case body 3, the protective cap 21 and lead wire connecting portion 17b are engaged with each other in the connecting portion receiving chamber 21a of the protective cap 21. More specifically, the engaging structure 23 includes an engaging portion 25 formed integrally with a wall portion (later described a main wall portion 21b of the protective cap 21 facing the motor case body) surrounding the connecting portion receiving chamber 21a of the protective cap 21 and an engaged portion 27 formed in the lead wire connecting portion 17b of the connection circuit board 17 so as to be engaged with the engaging portion 25 of the protective cap 21. In this configuration, when the protective cap 21 is brought close to the outer surface (one outer peripheral surfaces 3a of the motor case body 3 from which the lead wire connection portion 17b projects) of the motor case body 3, an engagement between the engaging portion 25 and engaged portion 27 is established.

In the present embodiment, an adhesive 29 is used in addition to the engaging structure 23 in fixing the protective cap 21. After the protective cap 21 has been attached to the motor case body 3 through the engaging structure 23, the adhesive 29 is filled in the connecting portion receiving chamber 21a of the protective cap 21, whereby the protective cap 21 is fixed to the motor case body 3 and the end bracket 15.

To achieve this engaging structure 23, the protective cap 21 and lead wire connecting portion 17b of the connection circuit board 17 have the following configurations in the present embodiment: the protective cap 21 has a main wall portion 21b facing the motor case body 3, a peripheral wall portion 21j extending toward the motor case body 3 from a peripheral portion 21c of the main wall portion 21b, and a pair of hooks 21d and 21e extending toward the motor case body 3 from the main wall portion 21b as the engaging portion 25; and the lead wire connecting portion 17b is shaped to include a pair of end engaged portions 17e and 17f capable of engaging with the pair of hooks 21d and 21e respectively. The main wall portion 21b of the protective cap 21 has a curved concave portion 21f formed so as to prevent the protective cap 21 from acting as an obstacle to the passage of the lead wires 19 when the protective cap 21 is attached to the motor case body 3. Further, a wall portion 21g of the peripheral wall portion 21j of the protective cap 21, located on the side of the end bracket 13, has a groove portion 21h formed so as to receive not shown some lead wires of the plurality of lead wires 19 if the some lead wires are not connected to the lead wire connecting portion 17b but brought outside the protective cap 21. There is no need to bring the some lead wires outside the protective cap 21, such a groove portion 21h need not be formed.

In the present embodiment, the peripheral wall portion 21j of the protective cap 21 has an opening portion 21i to be closed by a part of the end bracket 15, and the pair of hooks 21d and 21e are arranged at a position closer to the opening portion 21i of the protective cap 21 with respect to the lead wire connecting portion 17b. In this configuration, the shape of the pair of hooks 21d and 21e and the position of the pair of end engaged portions 17e and 17f are defined so that, in the course of bringing the protective cap 21 close to the outer surface of the motor case body 3, leading end portions 21d' and 21e' of the hooks 21d and 21e are slid on a surface 17g of the lead wire connecting portion 17b facing the opening portion 21i, and then engaged with the pair of end engaged portions 17e and 17f. More specifically, a sensor device for detecting the rotational position of the rotor is disposed on the side of the end bracket 15 in the present embodiment, so that there occurs a difference d between the end bracket 15 and motor case body 3, allowing a part of the end bracket 15 to serve as a wall to thereby close the opening portion 21i. The protective cap 21 is fixed to the motor case body 3 and the end bracket 15 using the adhesive 29.

As described above, in the present embodiment, the protective cap 21 including the connecting portion receiving chamber 21a is attached to the lead wire connecting portion 17b through the engaging structure 23, so that the lead wire connecting portion 17b can reliably be protected, as well as, the protective cap 21 can securely be attached to the motor case body 3 to make it difficult for the protective cap 21 to come off from the fixing position of the motor case body 3. In addition, in the present embodiment, the adhesive 29 is filled in the connecting portion receiving chamber 21a of the protective cap 21 after the protective cap 21 has been attached to the motor case body 3 through the engaging structure 23, so that the protective cap 21 can securely be fixed to the motor case body 3 and the end bracket 15.

In the present embodiment, the engaging structure 23 is configured in a such manner that an engagement between the engaging portion 25 and the engaged portion 27 is established when the protective cap 21 is brought close to the outer surface (one outer peripheral surfaces 3a of the motor case body 3 from which the lead wire connection portion 17b projects) of the motor case body 3, which makes it easy to perform the positioning of the protective cap 21 with respect to the motor case body 3 and, further, makes displacement unlikely when the protective cap 21 is fixed to the motor case body 3. In particular, the protective cap 21 has the main wall portion 21b facing the motor case body 3, peripheral wall portion 21j, and the pair of hooks 21d and 21e, and the lead wire connecting portion 17b is shaped to include the pair of end engaged portions 17e and 17f capable of engaging respectively with the pair of hooks 21d and 21e. With the above configuration, the positioning of the protective cap 21 becomes easier, thereby preventing the displacement of the protective cap 21.

In addition, in the present embodiment, the shape of the pair of hooks 21d and 21e and the position of the pair of end engaged portions 17e and 17f are defined as described above, so that even if a pulling force is applied to the protective cap 21 in the direction that the lead wire connecting portion 17b projects from the motor case body 3, the leading end portions 21d' and 21e' of the hooks 21d and 21e are hooked to the end engaged portions 17e and 17f. Further, even if a pulling force is applied to the protective cap 21 in an extending direction of the rotary shaft RA of the motor, the difference d between the end bracket 15 and motor case body 3 serves as a stopper on the side of the end bracket 15, and the pair of hooks 21d and 21e abut on the pair of end engaged portions 17e and 17f, respectively, on the side of motor case body 3. As a result, it is possible to prevent the protective cap 21 to be displaced from the fixing position not only in the direction that the lead wire connecting portion 17b projects from the motor case body 3 but also in the extending direction of the rotary shaft RA of the motor.

INDUSTRIAL APPLICABILITY

According to the present invention, the protective cap including the connecting portion receiving chamber is attached to the lead wire connecting portion through the engaging structure, so that the lead wire connecting portion can reliably be protected, as well as, the protective cap can securely be positioned with respect to the motor case and fixed to the motor case using the adhesive, thereby making it difficult for the protective cap to come off from the fixing position of the motor case body.

Further, the engaging structure between the protective cap and lead wire connecting portion includes the engaging portion and engaged portion and has a configuration in which an engagement between the engaging portion and engaged portion is established when the protective cap is brought close to the outer surface of the motor case body, which makes it easy to perform the positioning of the protective cap and, further, makes displacement unlikely when the protective cap is fixed.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:
1. A small-sized motor comprising:
a cylindrical motor case body;
a stator having a plurality of winding portions, which is provided inside the motor case body;
a rotor provided inside the stator;
a pair of end brackets which are fixed to both end portions of the motor case body and rotatably support a rotary shaft to which the rotor is fixed; and
a connection circuit board having a main portion and a lead wire connecting portion, the main portion being positioned between one of the end portions of the motor case body and one of the pair of end brackets, and the lead wire connecting portion projecting outwardly from the motor case body, wherein a plurality of wire-end portions extending from the plurality of winding portions are electrically connected to a circuit pattern on the connection circuit board, and a plurality of lead wires are electrically connected to a plurality of connection electrodes connected to the circuit pattern provided on the lead wire connecting portion;

the small-sized motor further comprises a protective cap, said protective cap cooperating with at least one of the motor case body and one of the pair of end brackets to define a connecting portion receiving chamber in which is received the lead wire connecting portion of the connection circuit board;

the protective cap is attached to the lead wire connecting portion through an engaging structure; and the protective cap is fixed to the motor case body and/or said one of the pair of end brackets using an adhesive, said adhesive being received within the connecting portion receiving chamber.

2. The small-sized motor according to claim 1, wherein the engaging structure includes an engaging portion formed integrally with a wall portion of the protective cap that partially defines the connecting portion receiving chamber and an engaged portion formed in the lead wire connecting portion of the connection circuit board so as to be engaged with the engaging portion; and the engaging portion and the engaged portion are configured so that an engagement between the engaging portion and the engaged portion is established when the protective cap is brought close to an outer surface of the motor case body.

3. The small-sized motor according to claim 2, wherein the protective cap includes the main wall portion facing the motor case body and a peripheral wall portion extending toward the motor case body from a peripheral portion of the main wall portion, the main wall portion having a pair of hooks extending toward the motor case body as the engaging portion; and the lead wire connecting portion of the connection circuit board is shaped to include a pair of end engaged portions capable of engaging with the pair of hooks.

4. The small-sized motor according to claim 3, wherein at least the peripheral wall portion of the protective cap has an opening portion closed by a part of the one end bracket, and the pair of hooks are arranged closer to the opening portion with respect to the lead wire connecting portion; and the shape of the pair of hooks and the position of the pair of end engaged portions are defined so that, in the course of bringing the protective cap close to the outer surface of the motor case body, leading end portions of the pair of hooks are slid on a surface of the lead wire connecting portion facing the opening portion and then engaged with the pair of end engaged portions.

5. The small-sized motor according to claim 1, wherein a sensor device for detecting the rotational position of the rotor is fixed to the one end bracket.

* * * * *